United States Patent
Beausoleil et al.

(10) Patent No.: US 9,341,780 B2
(45) Date of Patent: May 17, 2016

(54) OPTICAL CONNECTIONS

(75) Inventors: Raymond G. Beausoleil, Redmond, WA (US); Paul Kessler Rosenberg, Sunnyvale, CA (US); David A. Fattal, Mountain View, CA (US); Terrel Morris, Garland, TX (US); Marco Fiorentino, Mountain View, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 94 days.

(21) Appl. No.: 14/357,781

(22) PCT Filed: Dec. 9, 2011

(86) PCT No.: PCT/US2011/064126
§ 371 (c)(1),
(2), (4) Date: May 13, 2014

(87) PCT Pub. No.: WO2013/105918
PCT Pub. Date: Jul. 18, 2013

(65) Prior Publication Data
US 2014/0301702 A1  Oct. 9, 2014

(51) Int. Cl.
*G02B 6/42* (2006.01)
*G02B 6/30* (2006.01)
*G02B 6/26* (2006.01)
*G02B 6/124* (2006.01)

(52) U.S. Cl.
CPC  *G02B 6/262* (2013.01); *G02B 6/30* (2013.01); *G02B 6/124* (2013.01); *G02B 6/4206* (2013.01)

(58) Field of Classification Search
CPC .......... G02B 6/30; G02B 6/262; G02B 6/124; G02B 6/4206

USPC ....................... 385/31–39, 72, 147; 156/227.2
See application file for complete search history.

(56) References Cited

U.S. PATENT DOCUMENTS

| | | |
|---|---|---|
| 4,878,731 A | 11/1989 | Caron et al. |
| 6,185,358 B1 | 2/2001 | Park |
| 6,692,666 B2 | 2/2004 | Adams et al. |
| 6,883,975 B2 | 4/2005 | Clarkin et al. |
| 7,020,366 B2 | 3/2006 | Nakanishi et al. |
| 7,058,261 B2 | 6/2006 | Ghiron et al. |
| 7,680,371 B2 | 3/2010 | Cheben et al. |
| 8,265,435 B2* | 9/2012 | Fu ............................ G02B 6/34 156/272.2 |
| 2003/0174973 A1 | 9/2003 | Ishii et al. |

(Continued)

FOREIGN PATENT DOCUMENTS

| | | |
|---|---|---|
| CN | 1186249 A | 7/1998 |
| CN | 1445573 A | 10/2003 |

(Continued)

OTHER PUBLICATIONS

International Search Report & Written Opinion, Jul. 26, 2013, PCT Patent Application No. PCT/US2011/064126, 9 pages.

(Continued)

*Primary Examiner* — Akm Enayet Ullah
(74) *Attorney, Agent, or Firm* — Hewlett Packard Enterprise Patent Department (57) ABSTRACT

Techniques related to optical connectors are described. A ferrule includes an optical pathway for light transmission through the ferrule. In examples, a sub-wavelength grating (SWG) assembly is integrated in the ferrule, aligned with an end of the optical pathway.

15 Claims, 8 Drawing Sheets

(56) References Cited

U.S. PATENT DOCUMENTS

| | | |
|---|---|---|
| 2004/0022487 A1 | 2/2004 | Nagasaka et al. |
| 2011/0033156 A1 | 2/2011 | Sanghera et al. |
| 2011/0188805 A1 | 8/2011 | Fu et al. |
| 2011/0243507 A1 | 10/2011 | Kim et al. |

FOREIGN PATENT DOCUMENTS

| | | |
|---|---|---|
| CN | 1469147 A | 1/2004 |
| CN | 101788699 A | 7/2010 |
| JP | 05-297245 A | 11/1993 |
| JP | 06-250017 A | 9/1994 |
| JP | 2003-232963 A | 8/2003 |
| JP | 2003-233025 A | 8/2003 |
| JP | 2004184429 A | 7/2004 |
| JP | 2005221672 A | 8/2005 |
| KR | 20050074276 A1 | 7/2005 |
| WO | WO-2011093895 A1 | 8/2011 |

OTHER PUBLICATIONS

English translation (machine-generated) of Abstract from Chinese Patent Publication No. 101788699A [retrieved on Mar. 30, 2015], Retrieved from the Internet: <http://worldwide.espacenet.com/publicationDetails/biblio?DB=worldwide.espacenet.com&II=0&ND=3&adjacent=true&locale=en_EP&FT=D&date=20100728&CC=CN&NR=101788699A&KC=A>.

English translation (machine-generated) of Abstract from Japanese Patent Publication No. 2003-233025A [retrieved on Mar. 30, 2015], Retrieved from the Internet: <http://worldwide.espacenet.com/publicationDetails/biblio?DB=worldwide.espacenet.com&II=0&ND=3&adjacent=true&locale=en_EP&FT=D&date=20030822&CC=JP&NR=2003233025A&KC=A>.

* cited by examiner

OPTICAL CONNECTIONS

CROSS-REFERENCE TO RELATED APPLICATION

This application is a U.S. National Stage Application of and claims priority to International Patent Application No. PCT/US2011/064126, filed on Dec. 9, 2011, and entitled "OPTICAL CONNECTIONS".

BACKGROUND

Many applications depend on sending and receiving relatively large amounts of data. Technologies based on transmitting data using light are a convenient alternative offering high network bandwidth. There are a number of devices that use light for transmitting information. For example, optical fibers are capable of transmitting data over vast distances providing high network bandwidth. Further, photonic integrated circuits (PIC) integrate multiple photonic functions providing functionality for light signals.

Optical connectors may be used where a connect/disconnect capability is required in an optical communication system. Optical connectors may be used to, for example, connect equipment, interconnect optical fibers, or cross-connect optical cables within a system. In an optical connector, mating ferrules may receive fibers in fixed positions such that two optical fibers mate in coaxial alignment to effect an interconnection. A ferrule is a piece of a suitable material including one or more optical pathways for light transmission through the ferrule. For example, such an optical pathway may include a hole adapted to receive an optical fiber for light transmission through the ferrule.

In many applications, such as datacom and telecom applications, there is a trend towards compact connectors that can be mass-produced with reduced manufacturing costs. Further, for some specific applications, it is convenient to provide additional optical components in a connector for facilitating reliability or further functionality of the connector.

BRIEF DESCRIPTION OF THE DRAWINGS

In order that the present disclosure may be well understood, various examples will now be described with reference to the following drawings.

In the drawings, the dimensions of layers and regions are exaggerated for clarity of illustration.

DETAILED DESCRIPTION

In the following, numerous details are set forth to provide an understanding of the examples disclosed herein. However, it will be understood that the examples may be practiced without these details. Further, in the following detailed description, reference is made to the accompanying figures, in which various examples are shown by way of illustration. In this regard, directional terminology, such as "top," "bottom," "front," "back," "left," "right," "vertical," etc., is used with reference to the orientation of the figures being described. Because disclosed components can be positioned in a number of different orientations, the directional terminology is used for purposes of illustration and is in no way limiting. In the drawings, the dimensions of layers and regions are exaggerated for clarity of illustration. Like numerals are used for like and corresponding parts of the various figures. While a limited number of examples are illustrated, it will be understood that there are numerous modifications and variations therefrom.

In the following, the term "light" refers to electromagnetic radiation with wavelength(s) in the visible and non-visible portions of the electromagnetic spectrum, including infrared and ultra-violet portions of the electromagnetic spectrum. The term "light beam" refers to a ray of light including one or more spectral components. The term "wavefront" refers to the locus (i.e., a line or, in a wave propagating in three dimensions, a surface) of points in a light beam having the same phase. The term "stack" refers to an ordered heap of layers. Spacers may be interposed between the layers of a stack. It will be understood that when a layer or film is referred to or shown as being "between" two layers or films, it can be the only layer or film between the two layers or films, or one or more intervening layers or films may also be present.

As set forth above, there is a trend towards compact connectors that can be mass-produced with reduced manufacturing costs. Further, a connector may include additional optical components for facilitating reliability or further functionality.

For example, a conventional arrangement may include a lens arrangement arranged to implement beam expansion. Such lens arrangement is configured to (i) expand a beam emitted from an input optical channel, and (ii) couple the expanded beam into an output optical channel of the connector. Connectors may include a ferrule for mechanically enclosing light transmission elements. More specifically, a ferrule is a piece of a suitable material (such as, but not limited to, glass, ceramic, plastic or metal) including one or more optical pathways for light transmission through the ferrule. A ferrule may be formed by molding or any other suitable manufacturing method. As used herein, an "optical pathway" refers to any suitable structure or component of the ferrule that facilitates transmission of an optical signal through a ferrule. By way of example, the optical pathway may be adapted for receiving an optical fiber or any other type of optical waveguides for carrying a light signal. Further, the optical pathway may be adapted for receiving an active device such as, but not limited to, a vertical cavity surface emitting laser (VCSEL), a photo detector (e.g., a photo detector), or any other active optical device.

Generally, if additional optical elements are to be included, it is required to geometrically adapt the ferrule for integrating those optical elements. Integrating optical components may pose specific geometric constraints in the fabrication of ferrules that may significantly impact manufacturing costs of the connector. Further, integrating additional optical components may result in a bulky design of the connector, as the case may be when integrating lenses having a shape that poses restrictive geometrical constraints on the ferrule (e.g. a convex or a concave shape).

Examples herein illustrate integration of a sub-wavelength grating (SWG) assembly in a ferrule. The SWG assembly is aligned with an end of an optical pathway of the ferrule.

A SWG assembly includes one or more SWG layers arranged to implement a specific optical function in a connector such as, but not limited to, beam focusing, beam expansion, beam splitting, filtering of beam spectral components, beam polarization, or beam control (e.g., deflection of a beam). A SWG layer refers to a layer that includes a diffraction grating with a pitch that is sufficiently small to suppress all but the $0^{th}$ order diffraction. In contrast thereto, conventional wavelength diffraction gratings are characterized by a pitch that is sufficiently high to induce higher order diffraction of incident light. In other words, conventional wavelength diffraction gratings split and diffract light into several beams travelling in different directions. A pitch of a SWG layer may range from 10 nm to 300 nm or from 20 nm to 1 μm. How the SWG layer refracts an incident beam may be determined at manufacturing by properly selecting the dimensions of the diffractive structure of the SWG.

A SWG assembly facilitates implementing a vast variety of optical functionalities in an optical connector. More specifically, a SWG arrangement, as illustrated in Section "Configuring Sub-Wavelength Gratings," may provide optical functionalities analogous to those of conventional optical devices such as lenses, prisms, beam splitters, beam filters, or polarizers without compromising optical performance of the connector.

In addition to providing optical functionality, a SWG grating may be fabricated with a relatively simple shape that facilitates (a) integration in the ferrule without imposing geometric constraints that significantly increase manufacturing costs, and (b) a compact design of the connector. More specifically, a SWG grating may be manufactured composed of thin layers with a planar shape. A SWG arrangement characterized by a planar, thin shape facilitates integration in a connector, as illustrated below in Section "Connectors". In contrast thereto, conventional optical components may be characterized by shapes that are more difficult to integrate (e.g., a convex or concave shape in a lens arrangement).

The following description is broken into sections. The first section, labeled "Connectors," illustrate examples of connectors and connector components. The second section, labeled "Manufacturing of connectors," describes examples of methods for manufacturing connectors. The third section, labeled "Configuring Sub-Wavelength Gratings," describes examples of configurations of SWGs that may be implemented in connector components as described herein. The fourth section, labeled "SWG assemblies," describes examples of SWG assemblies that may be implemented in connector components as described herein.

Figure 1A:
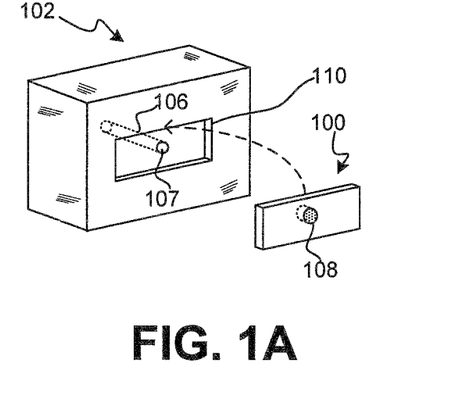
FIG. 1A is a schematic perspective view of a ferrule and a SWG assembly decoupled from the ferrule according to an example.
Figure 1B:
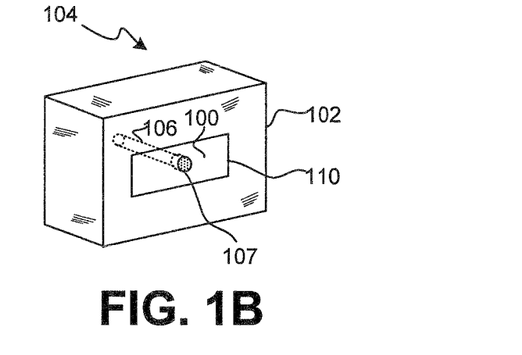
FIG. 1B is a schematic perspective view of an optical connector sub-assembly including the ferrule with the SWG assembly coupled thereto according to an example.

CONNECTORS: FIGS. 1A and 1B illustrate an example of an optical connector sub-assembly 104 in which a SWG assembly 100 can be integrated in a ferrule 102 by introduction into a receptacle 110 built in the ferrule. FIG. 1A is a schematic perspective view depicting a ferrule 102 and a SWG assembly 100. FIG. 1A illustrates these elements in a decoupled state. FIG. 1B is a schematic perspective view of optical connector sub-assembly 104 including SWG assembly 100 integrated in ferrule 102.

Ferrule 102 includes an optical pathway 106 formed as an opening adapted for receiving an optical fiber 107. In the illustrated example, optical fiber 107 is illustrated mounted in ferrule 102. It will be understood that ferrules may be provided without a waveguide element (e.g., an optical fiber) received in a pathway. For example, optical fiber 107 may be mounted after integration of SWG assembly 100 in ferrule 102. Further, as mentioned above, pathway 106 may be adapted for receiving a variety of waveguide types such as, but not limited to, a dielectric slab waveguide, a strip waveguide, or a rib waveguide. A dielectric slag waveguide may be comprised of three layers of materials with different dielectric constants, the material being chosen such that light is confined in the middle layer by total internal reflection. A strip waveguide may be comprised of a strip of a light guiding layer confined between cladding layers. In a rib waveguide, the light guiding layer is comprised of a slab with a strip (or several strips) superimposed onto it.

In this example, ferrule 102 is for a single terminal connector. More specifically, ferrule 102 is designed to be implemented in a connector for inter-connecting one input channel and one output channel. Ferrule 102 is arranged for receiving one optical fiber 107 at optical pathway 106.

SWG assembly 100 is designed to optically match ferrule 102. More specifically, SWG assembly 100 includes an optical coupling region 108 that corresponds to optical pathway 106; coupling region 108 is disposed at SWG assembly 100 such that it can be aligned with optical fiber 107 at ferrule 102 when SWG assembly 100 is mounted on ferrule 102. Coupling region 108 includes one or more SWG layers (illustrated below in Section "SWG assemblies") arranged to implement the specific optical functionality of SWG assembly 100 in connector 104. Some specific optical functions that may be implemented by SWG assembly 100 include beam separation, beam splitting, filtering of spectral components, beam polarization, or combinations of such optical functionalities within an optical connector.

According to some examples, a ferrule may include a positioning arrangement to align a SWG assembly with an end of an optical pathway at the ferrule. As used herein, a positioning arrangement refers to one or more elements disposed in the ferrule to fix the position of the SWG assembly when integrated in the ferrule. When a SWG assembly is positioned on a ferrule at a positioning arrangement, an optical coupling region of the SWG assembly is aligned with an optical pathway of the ferrule, as illustrated by FIG. 1B. A positioning arrangement may include a receptacle arranged to receive a SWG assembly. For example, ferrule 102 includes a socket 110 formed as a receptacle built in ferrule 102. Socket 110 is dimensioned to receive and hold SWG assembly 100. Socket 110 is adapted to receive SWG assembly 100 such that the assembly is automatically aligned to optical pathway 106 when mounted on socket 110. That is, socket 110 may be dimensioned and positioned such that when SWG assembly 100 is inserted therein, coupling region 108 is aligned to optical pathway 106. Generally, a positioning arrangement may include any structure suitable to fix the position of a SWG assembly 100. Examples of positioning arrangement include, but not limited to, sockets, bevels, pins (see FIGS. 3A and 3B for an example), clamps, or combinations of such elements.

Figure 2A:
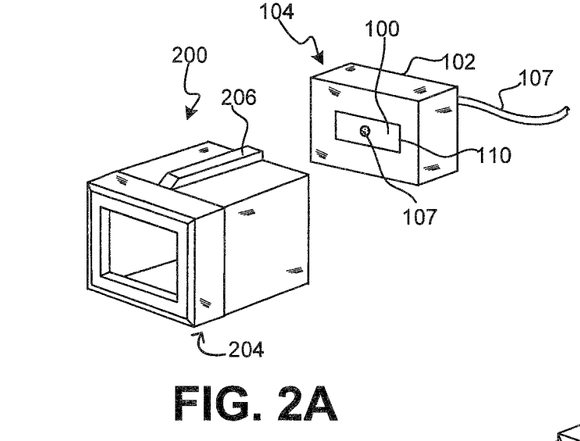
FIG. 2A is a schematic perspective view of a connector housing and the connector sub-assembly of FIG. 1B decoupled from the housing according to an example.
Figure 2B:
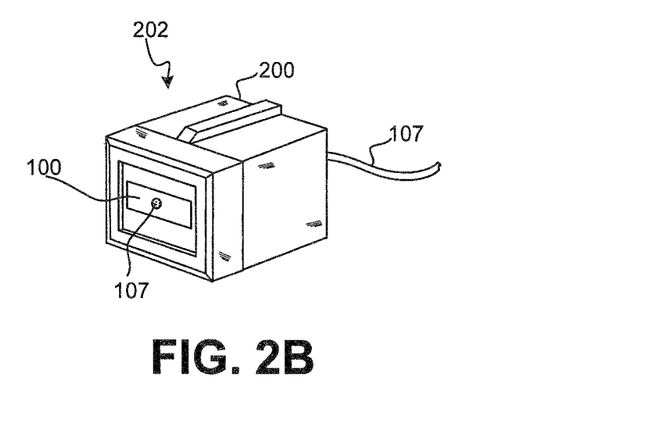
FIG. 2B is a schematic perspective view of an optical connector including the connector sub-assembly coupled to the housing according to an example.

As illustrated in FIG. 1B, SWG assembly 100 integrated in ferrule 100 forms a connector sub-assembly 104. Connector sub-assembly 104 may form part of an optical connector such as connector 200 illustrated by FIGS. 2A and 2B. FIG. 2A is a schematic perspective view of a connector housing 200 and connector sub-assembly 104 according to an example. FIG. 2A illustrates these elements in a decoupled state. FIG. 2B is a schematic perspective view of an optical connector 202 including connector sub-assembly 104 coupled to connector housing 200. Connector 202 is constructed with a mating geometry for facilitating coupling thereof with a corresponding mating component (not shown). In the illustrated example, housing 200 is formed with a recessed front portion 204 and a guide 206 for facilitating insertion of connector 202 into a corresponding mating structure.

Connector 202 may include additional elements for facilitating optical connection with a mating component such as biasing springs, further guides, slots, securing elements (e.g., latches), or mechanical stops. Further, connector 202 may include further elements for facilitating an appropriate support of optical fiber 107 such as fiber fittings (e.g., crimp eyelets or fiber boot bares).

It will be understood that the shown design of connector 202 is merely illustrative. A variety of shapes for an optical connector are contemplated such as, but not limited to, connector shapes analogous to a FC connector, a FDDI connector, a LC connector, a LuxCis connector, a MT-RJ connector, a SC connector, a ST connector, or a TOSLINK connector. Further, although connector 200 is illustrated as a single terminal connector, it may be adapted to interconnect any number of terminals required for a particular optical application. That is, ferrule 102 may be adapted to receive any number of optical fibers, and SWG assembly 100 may include any corresponding number of optical coupling regions. More specifically, an optical connector as described herein may be a multiple terminal (MT) connector, as illustrated with respect to FIGS. 4A and 4B. Further, connector 202 may be configured for connecting multicore optical fibers.

FIGS. 3A to 4B illustrate other examples of integration of a SWG arrangement in a ferrule.

According to some examples, a SWG assembly may be aligned to an end of an optical pathway in a ferrule using an element of the ferrule as a fiducial marker. Automatic alignment may be performed using a machine vision system operatively connected to a motorized drive for automatically positioning a SWG assembly aligned with an optical pathway. Automatic alignment may be used as an alternative or in addition to a positioning arrangement such as socket 110, in particular for the case that a positioning arrangement does not provide for a snug fit of the SWG assembly in the ferrule. In the latter case, the positioning arrangement itself, optionally in combination with other elements of the ferrule, may be used as the fiducial marker.

Figure 3A:
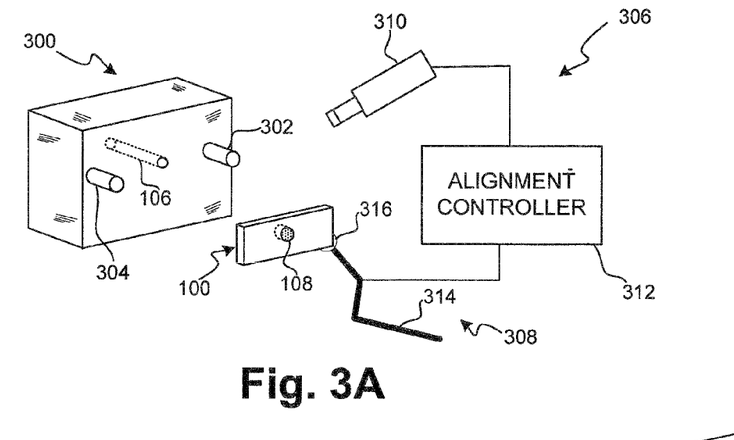
FIG. 3A is a schematic perspective view of a ferrule and a SWG assembly decoupled from the ferrule according to another example.
Figure 3B:
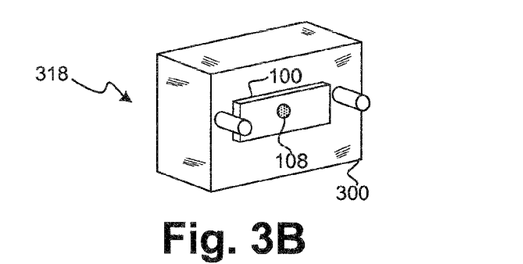
FIG. 3B is a schematic perspective view of an optical connector sub-assembly including the ferrule with the SWG assembly coupled thereto according to another example.

Referring to FIGS. 3A and 3B, a ferrule 300 includes alignment pins 302, 304. Alignment pins 302, 304 are an example of a mating element integrated in the ferrule to couple the ferrule to another optical device. For example, ferrule 300 may form part of a connector for interconnecting a ferrule to a photonic integrated device (PIC). The PIC (not shown) may include mating elements corresponding to those in the ferrule. For example, a PIC may include two holes suitable for mating alignment pins 302. Mating elements as those illustrated also facilitate optically aligning the optically pathways in the ferrule with corresponding optical pathways (e.g., waveguides integrated in a PIC for carrying optical signals) in a complementary device. A mating arrangement in the ferrule is not limited to alignment pins as illustrated in the present example. A mating arrangement in the ferrule may include any element suitable for implementing alignment of the ferrule with a complementary optical device such as appropriately arranged holes, slots, or sockets.

There are a number of ways for implementing alignment pins 302, 304 on ferrule 300. In some examples, alignment pins 302, 304 are first formed as individual elements (e.g., by precision machining) and integrated into ferrule 300 by any suitable manufacturing process. For example, guide pin bores may be manufactured in the ferrule and alignment pins 302, 304 may be inserted therein. The pins may be held in place by bonding or through a pin retainer element coupled to the ferrule. The positions of alignment pins 302, 304 may be lithographically defined on ferrule 300. Thereby, a high-precision definition of the pin position is facilitated. Alternatively, alignment pins 302, 304 may be monolithically formed in ferrule 300. For example the pins may be molded into or machined from the body of the ferrule. Alignment pins 302, 304 protrude a sufficient distance to engage a mating geometry (e.g., a hole) of an optical device complementary to ferrule 300. Additionally, mating elements such as pins 302, 304 may include a chamfer or the like (not shown) at the edges to facilitate alignment and prevent wear and debris formation during connection.

In the illustrated example, SWG assembly 100 may be integrated in ferrule 300 by the following process: (i) automatically aligning SWG assembly 100 or, more specifically, coupling region 108 of SWG assembly 100, with optical pathway 106 of ferrule 300 such that SWG assembly 100 can optically couple pathway 106 with an optical device complementary to ferrule 300; and (ii) bonding SWG assembly 100 to ferrule 300 by, e.g., applying an appropriate glue in the interface between SWG assembly 100 and ferrule 300 or by activating suitable fastening elements arranged on ferrule 300.

The automatic alignment may be performed by a suitable alignment system based on machine vision, as illustrated in the example of FIG. 3A. An alignment system 306 includes a robot device 308 and a surveyance system 310 operatively coupled to an alignment controller 312. Robot device 308 is illustrated including a robot arm 314 with a robot clamp 316 suitable to hold and carry SWG assembly 100. Surveyance system 310 is arranged to provide optical guidance to robot device 308. Surveyance system 310 may include one or more cameras arranged to acquire images of ferrule 300 and SWG assembly 100 during the alignment process. Alternatively or in addition thereto, surveyance system 310 may include position detection elements suitable to detect the position of SWG assembly 100 and elements in ferrule 300. Alignment controller 312 is arranged to receive images and/or position data acquired by surveyance system 310 and process the received information so as to (a) recognize elements of SWG assembly 100 and ferrule 300, (b) determine the relative spatial location of these elements, (c) determine actions to be performed by robot device 308 for alignment, and (d) cause robot device 308 to perform the determined actions.

Alignment controller 312 may be implemented, for example, by one or more discrete modules (or data processing components) that are not limited to any particular hardware, firmware, or software (i.e., machine readable instructions) configuration. Controller 312 may be implemented in any computing or data processing environment, including in digital electronic circuitry, e.g., an application-specific integrated circuit (ASIC), a programmable digital signal processor (DSP) or in computer hardware, firmware, device driver, or software (i.e., machine readable instructions).

In the particular example illustrated in FIG. 3A, alignment system 306 uses alignment pins 302, 204 as reference for performing the alignment. More specifically, the relative position between the pins and optical pathway 106 as well as the dimensions of the pathway and SWG assembly 100 may be predefined and stored in a memory device (not shown) coupled to or integrated into alignment controller 312. Alignment controller 312 may extract live position data related to the relative position between pins 302, 304 and SWG assembly 100 from images acquired by surveyance system 310 during alignment. Alignment controller 312 may then combine the live position data with the predefined positions and dimensions for determining the alignment path to be carried out by robot device 308 for performing the automatic alignment. During the alignment process, further images may be acquired and processed as a further guidance in aligning SWG assembly 100. FIG. 3B shows the result of the alignment process: SWG assembly 100 is integrated in ferrule 300 so as to form an optical connector sub-assembly 318.

According to some examples, in a connector, a ferrule may include a mating element and a SWG assembly may include a corresponding mating element. These mating elements at the ferrule and the SWG assembly are arranged so as to align the SWG assembly with the end of an optical pathway in the ferrule. Such arrangements are illustrated, by way of example, with respect to FIGS. 4A, 4B.

Figure 4A:
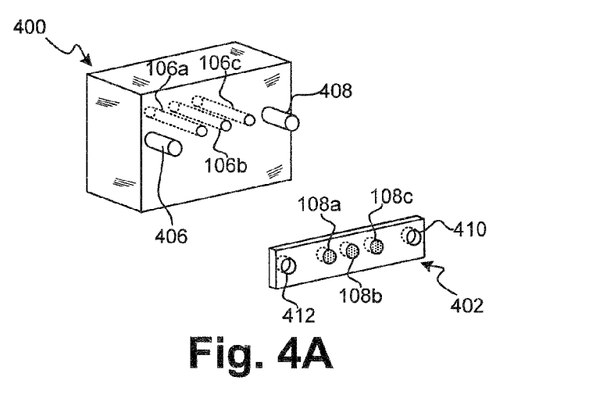
FIG. 4A is a schematic perspective view of a ferrule and a SWG assembly decoupled from the ferrule according to yet another example.
Figure 4B:
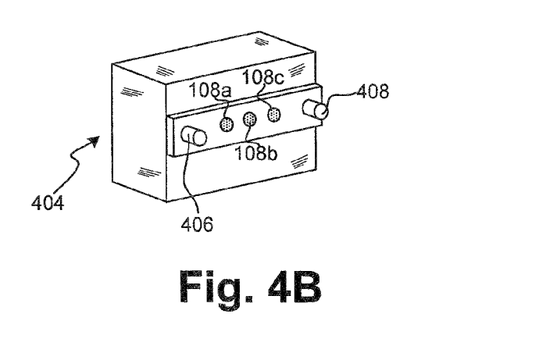
FIG. 4B is a schematic perspective view of an optical connector sub-assembly including the ferrule with the SWG assembly coupled thereto according to yet another example.

FIG. 4A is a schematic perspective view depicting a ferrule 400 and a SWG assembly 402. FIG. 4A illustrates these elements in a decoupled state. FIG. 4B is a schematic perspective view of an optical connector sub-assembly 404 including SWG assembly 402 integrated in ferrule 400.

Ferrule 400 is for a multiple terminal (MT) connector. A MT connector refers to a connector that can interconnect a plurality of input optical channels to a plurality of corresponding output optical channels. In examples herein, a ferrule for a MT connector may include a plurality of optical pathways. In that case, the positioning arrangement is to align a SWG assembly with ends of the optical pathways. In the illustrated example, ferrule 400 is for a three terminal connector and, therefore, includes optical pathways 106a-106c. Correspondingly, SWG assembly 402 includes a corresponding number of coupling regions 108a-108c. Further, ferrule 400 includes alignment pins 406, 408, which may be formed similarly as described above with respect to pins 302, 304 (see description above regarding FIG. 3A). Pins 406, 408 are arranged to align SWG assembly 402 (or, more specifically, coupling regions 108a-108c) to pathways 106a-106c in collaboration with mating bores 410, 412 at SWG assembly 402. Therefore, pins 406, 408 may be seen as performing the same function as the positioning arrangements illustrated above with respect to FIG. 1A (see socket 110).

The alignment pins illustrated above with respect to FIGS. 3A and 4B may be sacrificial elements. That is, alignment pins may be used to accomplish the alignment of the SWG assembly with pathways in a corresponding ferrule; after alignment, the SWG assembly may be bonded to the ferrule; and, after bonding, the alignment pins may be removed. In some examples, the alignment pins are arranged to match the dimensions of the mating elements. For example, in the example illustrated in FIG. 4A, pins 406, 408 may have the same length than bores 410, 412 so that, when SWG assembly 402 is integrated with ferrule 400, the front ends of the pins are flushed with a front surface of SWG assembly 402.

Figure 5A:
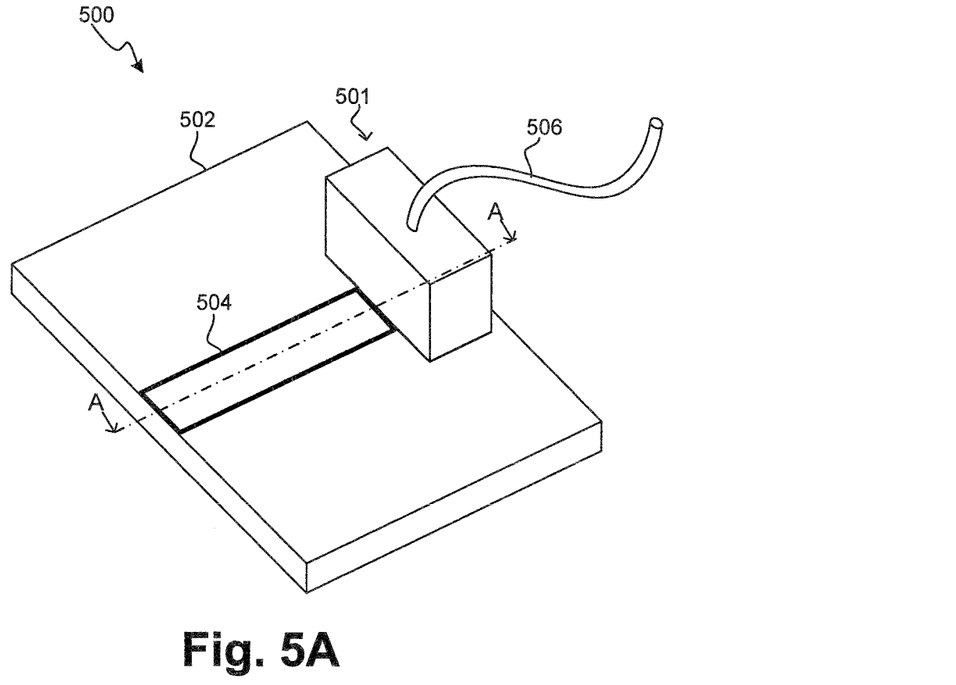
FIG. 5A is a perspective view of an optical system including a connector and a complementary optical device in a connected state.
Figure 5B:
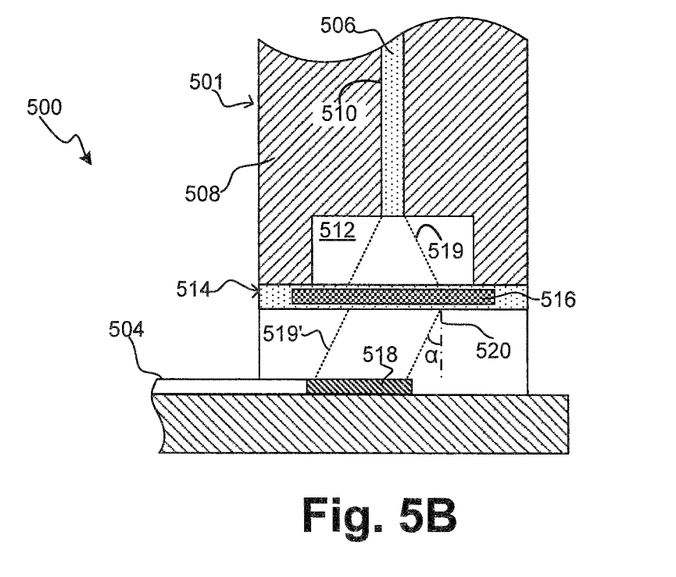
FIG. 5B is cross-sectional view along line A-A of the optical system of FIG. 5A shown in operation.

As set forth above, an optical connector may provide beam expansion as illustrated in the examples of FIGS. 5A and 5B. Beam expansion is convenient for facilitating resilient optical coupling, i.e. optical coupling with a lower sensitivity to relative displacement between the connected components as compared to, for example, point-to-point connection. In some applications, beam expansion is particularly appropriate for connection of single mode optical fiber.

FIG. 5A is a perspective view of an optical system 500 including connector 501 and a complementary optical device 502 in a connected state. FIG. 5B is cross-sectional view along line A-A of a portion of optical system 500 shown in operation. Complementary optical device 502 is illustrated as a PIC including an optical waveguide 504. Connector 500 is arranged to optically interconnect optical fiber 506 to waveguide 504. More specifically, connector 500 includes a ferrule 508 with an optical pathway 510 wherein optical fiber 506 is received. Pathway 510 ends in a transparent portion 512, which may be a cavity filled with air or a solid portion filled with a transparent material such as a silicon oxide.

A SWG assembly 514 is located across cavity 512 with a SWG layer 516 positioned aligned with pathway 510 and, consequently, aligned with optical fiber 506. An end of waveguide 504 is arranged to coincide with connector 500. A coupling element 518 is arranged at that end of waveguide 504 to couple light into waveguide 504. Coupling element 518 may include a further SWG assembly (not shown) configured to optically couple light into waveguide 504. Such a SWG may be arranged to implement this function by following the guidelines in Section CONFIGURING SUB-WAVELENGTH GRATINGS. Other alternative elements for effecting coupling of light into waveguide 504 include conventional gratings, tapered optical fibers, or planar graded-index (GRIN) lenses.

FIG. 5B depicts connector 500 in operation for coupling a light beam 519 emitted by optical fiber 506 to waveguide 504. More specifically, optical fiber 506 emits a diverging beam 519 into transparent portion 512. Diverging beam 519 propagates through portion 512 and impinges on SWG assembly 514, more specifically, on SWG layer 516. SWG layer 516 is arranged to optically process beam 519 into a collimated beam 519' directed towards coupling element 518 forming an angle a relative to axis 520 perpendicular to waveguide 504. SWG layer 516 may be arranged to implement beam collimation and beam deflection following guidelines illustrated in Section CONFIGURING SUB-WAVELENGTH GRATINGS.

SWG layer 516 is illustrated as a single layer that implements these functions. In other examples, SWG assembly 514 may include two or more layers for implementing the above functions. Further, SWG assembly 514 may include other layers for implementing further optical functions in the processing of beam 519 such as beam polarization, filtering of spectral components, or other forms of beam shaping as illustrated in Section CONFIGURING SUB-WAVELENGTH GRATINGS.

Connector 500 is illustrated in operation to couple light beam 519, emitted by optical fiber 506, to waveguide 504. It will be understood that connector 500 may operate in the reverse, namely, to couple into optical fiber 506 a light beam processed by complementary optical device 502 and emitted by coupling element 518 towards SWG assembly 514.

Figure 6:
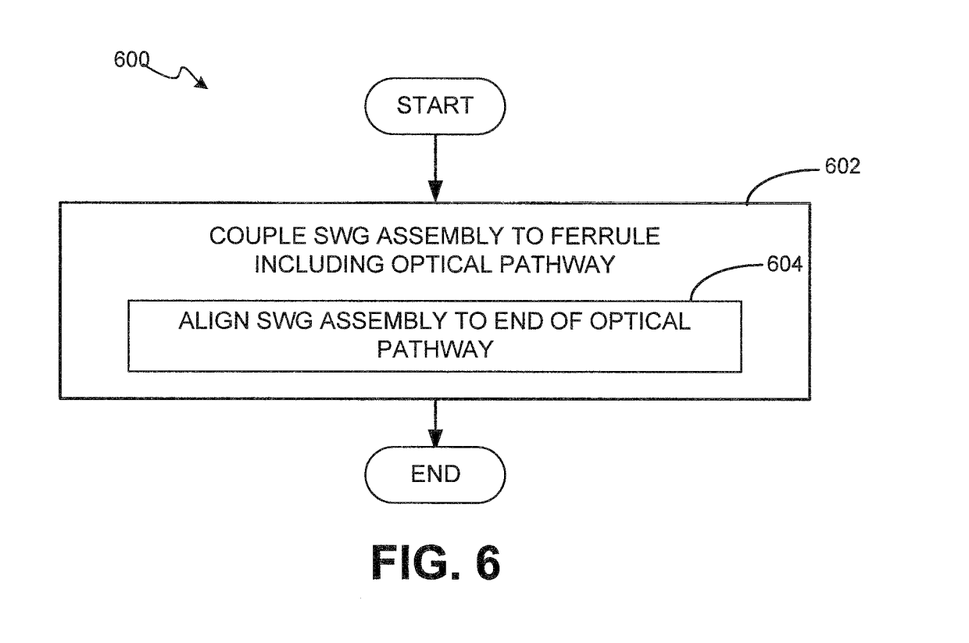
FIG. 6 is a diagram depicting a process flow for manufacturing a waveguide connector.

MANUFACTURING OF CONNECTORS: FIG. 6 illustrates examples of a method 600 for manufacturing waveguide connectors such as connectors 202, 501 (see FIGS. 2B, 5B) or connectors in which sub-assemblies 104, 318, 404 (see FIGS. 1B, 3B, 4B) are implemented. Implementation of method 600, however, is not limited to those examples of connectors.

At 602, a SWG assembly is coupled to a ferrule including one or more optical pathways. By way of example, the SWG assembly may correspond to SWG assemblies 100, 402, 514; the ferrule and the optical pathways may correspond to ferrules 102, 300, 400, 508 and their respective optical pathways 106, 106a-106c, 506. These components are illustrated above with respect to FIGS. 1A-5B. Block 602 may include aligning 604 the SWG assembly to an end of one or more optical pathways. Coupling of the SWG assembly to the ferrule and pathway alignment is illustrated above with respect to FIGS. 1A-1B, 3A-3B, and 4A-4B.

In some examples, illustrated above, coupling 602 the SWG assembly may include inserting the SWG assembly in a receptacle formed at the ferrule so as to align the SWG assembly to the optical pathway end. A non-limiting example of such coupling is illustrated above with respect to FIGS. 1A and 1B in which SWG assembly 100 is inserted into socket 110. Socket 110 and SWG assembly 100 are dimensioned such that, after insertion, SWG assembly 110 (more particularly, coupling region 108) is aligned to an end of optical pathway 106.

In some other examples, illustrated above, coupling 602 the SWG assembly may include automatically aligning the SWG assembly to an end of an optical pathway of the ferrule using an element of the ferrule as fiducial marker. A non-limiting example of such coupling is illustrated above with respect to FIGS. 3A and 3B in which SWG assembly 100 is automatically aligned by an alignment system 306 using pins 302, 304 as fiducial markers. In this particular example, the elements of the ferrule used as fiducial markers (i.e., pins 302, 304) accomplish a further function (in this example, mechanically coupling the ferrule to a complementary optical component). In other examples the elements of the ferrule used as fiducial markers are elements provided exclusively to this function, such as markers at pre-determined positions on the ferrule.

In still some other examples, illustrated above, coupling 602 the SWG assembly may include coupling complementary elements formed at the ferrule and the SWG assembly so as to align the SWG assembly to the optical pathway end. A non-limiting example of such coupling is illustrated above with respect to FIGS. 4A and 4B, in which pins 406, 408 are arranged as coupling complementary elements to mating bores 410, 412, which act as corresponding guides to pins 406, 408. As illustrated in FIG. 4B, when SWG assembly 402 is inserted into pins 406, 408, SWG assembly 402 (more specifically, coupling regions 108a-108c) is aligned with pathways 106a-106c.

Figure 7:
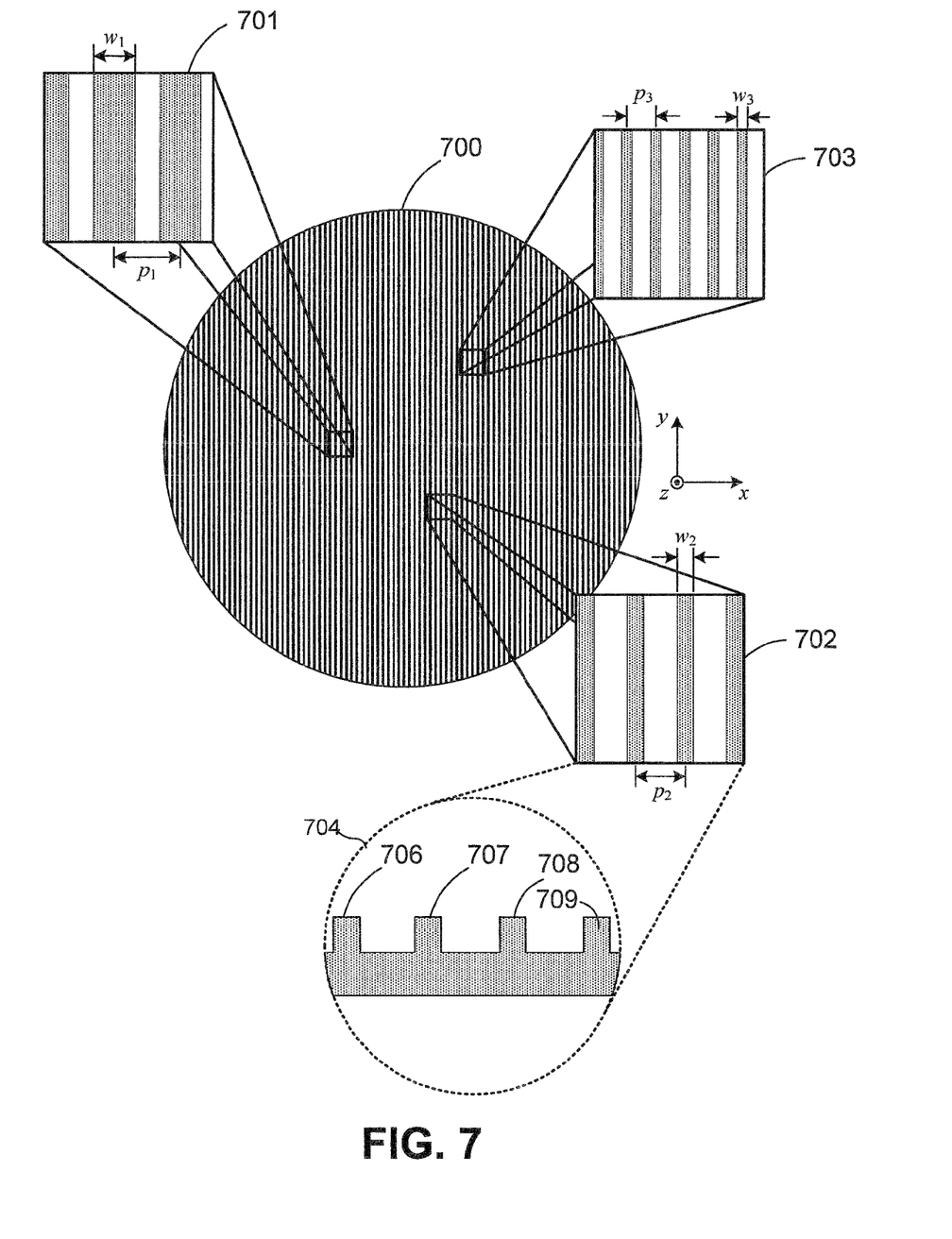
FIG. 7 shows a top plane view of a sub-wavelength (SWG) layer configured with a grating pattern according to an example.

CONFIGURING SUB-WAVELENGTH GRATINGS: FIG. 7 shows a top view of a SWG layer 700 configured with a grating pattern according to an example. In this example, SWG layer 700 includes a number of one-dimensional grating sub-patterns. Three grating sub-patterns 701-703 are depicted enlarged. Each grating sub-pattern includes a number of regularly arranged diffractive structures. In the depicted example, the diffractive structures are illustrated as spaced wire-like portions of SWG layer material (hereinafter referred to as "lines"). The lines extend in the y-direction and are spaced in the x-direction. An enlarged end-on view 704 of grating sub-pattern 702 is also depicted. As illustrated by end-on view 704, SWG layer 700 may be a single layer with lines, such as lines 706-709, separated by grooves formed in the layer.

A sub-pattern of a SWG layer is characterized by one or more periodic dimensions characteristic of the diffractive structure. In the illustrated example, the periodic dimensions correspond to (a) the spacing of the lines, and (b) the line width in the x-direction. More specifically, sub-pattern 701 comprises lines of width $w_1$ periodically spaced with a period $p_1$; sub-pattern 702 comprises lines with width $w_2$ periodically spaced with a period $p_2$, and the sub-pattern 703 comprises lines with width $w_3$ periodically spaced with a period $p_3$. A grating sub-patterns form a sub-wavelength grating if a characteristic dimension thereof (e.g., periods $p_1$, $p_2$, or $p_3$) is smaller than the wavelength of the particular incident light for which it is designed to operate. For example, a characteristic dimension of a SWG (e.g., periods $p_1$, $p_2$, or $p_3$) can range from 10 nm to 300 nm or from 20 nm to 1 µm. Generally, the characteristic dimensions of a SWG are chosen depending on the wavelength of the light for which a particular optical device is designed to operate.

$0^{th}$ order diffracted light from a sub-region acquires a phase φ determined by the line thickness t, and the duty cycle η, which may be defined by:

$$\eta = \frac{w}{p},$$

where w is the line width and p is the period of the lines associated with the region.

Each of the grating sub-patterns 701-703 diffract incident light differently due to the different duty cycles and periods associated with each of the sub-patterns. SWG layer 700 may be configured to interface incident light in a specific manner by adjusting the period, line width, and line thickness of the lines.

Figure 8:
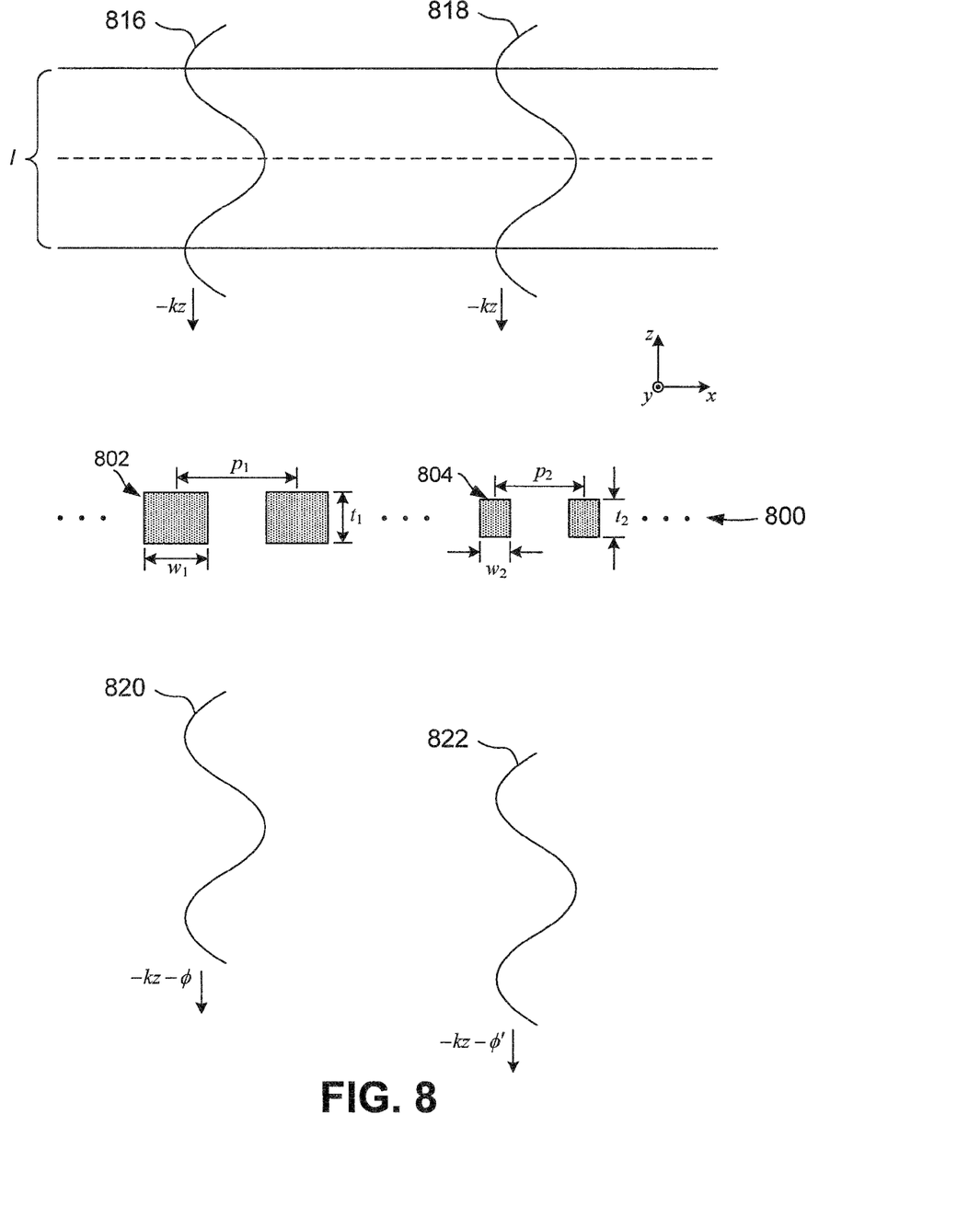
FIG. 8 shows a cross-sectional view of a SWG according to an example.

FIG. 8 shows a cross-sectional view of a SWG 800 in operation according to an example. The Figure depicts portions of two separate grating sub-patterns 802 and 804 of SWG 800. The sub-patterns 802 and 804 can be located in different regions of SWG 800. The thickness $t_1$ of the lines of sub-pattern 802 are greater than the thickness $t_2$ of the lines of sub-pattern 804, and the duty cycle $\eta_1$ associated with the lines in sub-pattern 802 is greater than the duty cycle $\eta_2$ associated with the lines of sub-pattern 804.

FIGS. 7 and 8 illustrate SWGs based on a grating with a non-periodic sub-wavelength pattern. Such SWGs are characterized by a spatially varying refractive index, which facilitates implementing an arbitrary diffractive element. The basic principle is that light incident on a non-periodical SWG (e.g., SWG 800) may become trapped therein and oscillate for a period of time within portions of the grating. The light is ultimately transmitted through the SWG, but with the portion of light transmitted through a sub-region (e.g., sub-region 802) acquiring a larger phase shift than the portion of light transmitted through a sub-region with different characteristic dimensions (e.g., sub-region 804 with respect to sub-region 802).

As shown in the example of FIG. 8, incident wavefronts 816 and 818 impinge on SWG 800 with the same phase, but a wavefront 820 is transmitted through sub-pattern 802 with a relatively larger phase shift φ than the phase shift φ' acquired by a wavefront 822 transmitted through sub-pattern 804.

In some examples, a SWG layer may be provided with reflecting layers disposed parallel to the SWG and adjacent to opposite sides thereof. Thereby, resonant cavities may be formed on both sides of the SWG. Light may then become trapped on these resonant cavities and become ultimately transmitted through the reflection layers with different phases in the beam similarly as shown in FIG. 8.

A SWG layer may be arranged with so-called polarized diffractive elements (hereinafter referred to as polarized SWG layer). In a polarized SWG layer, how light is reflected or transmitted therethrough depends on the specific polarization of incident light. More specifically, elements of the SWG may be arranged to be sensitive to polarization of incident light. The thickness and pitch of the SWG may be chosen to be polarization sensitive as described in the international patent application with publication number WO 2011/136759, which is incorporated herein by reference to the extent in which this document is not inconsistent with the present disclosure and in particular those parts thereof describing SWG design.

Alternatively, a SWG layer may be arranged with so-called unpolarized diffractive elements, so that how light is reflected or transmitted does not substantially depend on the specific polarization of incident light. More specifically, elements of the SWG may be arranged to be insensitive to polarization of incident light. Such SWG layers are referred to as unpolarized SWGs.

An unpolarized SWG is designed by an appropriate selection of the pattern dimensions. A transmission curve indicative of resonances for particular characteristics dimensions of the SWG may be used to design an unpolarized SWG. More specifically, for arranging a SWG layer with unpolarized diffractive elements, plots of transmittance and phase shift as a function of duty cycle for a particular design of a SWG layer may be obtained. Resonances for particular duty cycle values may be indentified in these plots. (Resonances correspond to duty cycle values, where the reflection peaks and the transmission drops while undergoing a phase jump.) Generally, between these two resonances, the transmission is high and the transmitted phase varies smoothly. Using this data, an unpolarized transmissive SWG can be designed. More specifically, the dimensions of diffractive elements in the SWG layer may be chosen such that the transmission characteristics of sub-patterns of the grating are comprised between resonances in the transmission curves so that a SWG is insensitive to polarization of an incident wavefront.

Following the above procedures, an unpolarized SWG layer may be arranged to control a wavefront incident thereon or to perform other optical functions such as focusing, collimating, or expanding a wavefront incident thereon. The basic principle is to choose the dimensions of the dimensions of diffractive elements in the SWG such that the transmission characteristics of sub-patterns of the grating are comprised between resonances in the transmission curves. Moreover, using such design approach, a SWG layer may be arranged with a low aspect ratio such as an aspect ratio below 10:1 or, more specifically, an aspect ratio below 5:1 or, even more specifically, an aspect ratio below 1:1. Thereby, it is facilitated a straightforward mass production of SWG layers using micro-fabrication processes such as deep-UV or nano-imprint lithography.

Some examples of SWG layers with unpolarized diffractive elements are illustrated the article titled "A Silicon Lens for Integrated Free-Space Optics," by Fattal et al. published in Integrated Photonics Research, Silicon and Nanophotonics, OSA Technical Digest (CD) (Optical Society of America, 2011), which is incorporated herein by reference to the extent in which this document is not inconsistent with the present disclosure and, in particular, those parts thereof describing SWG design.

Figure 9:
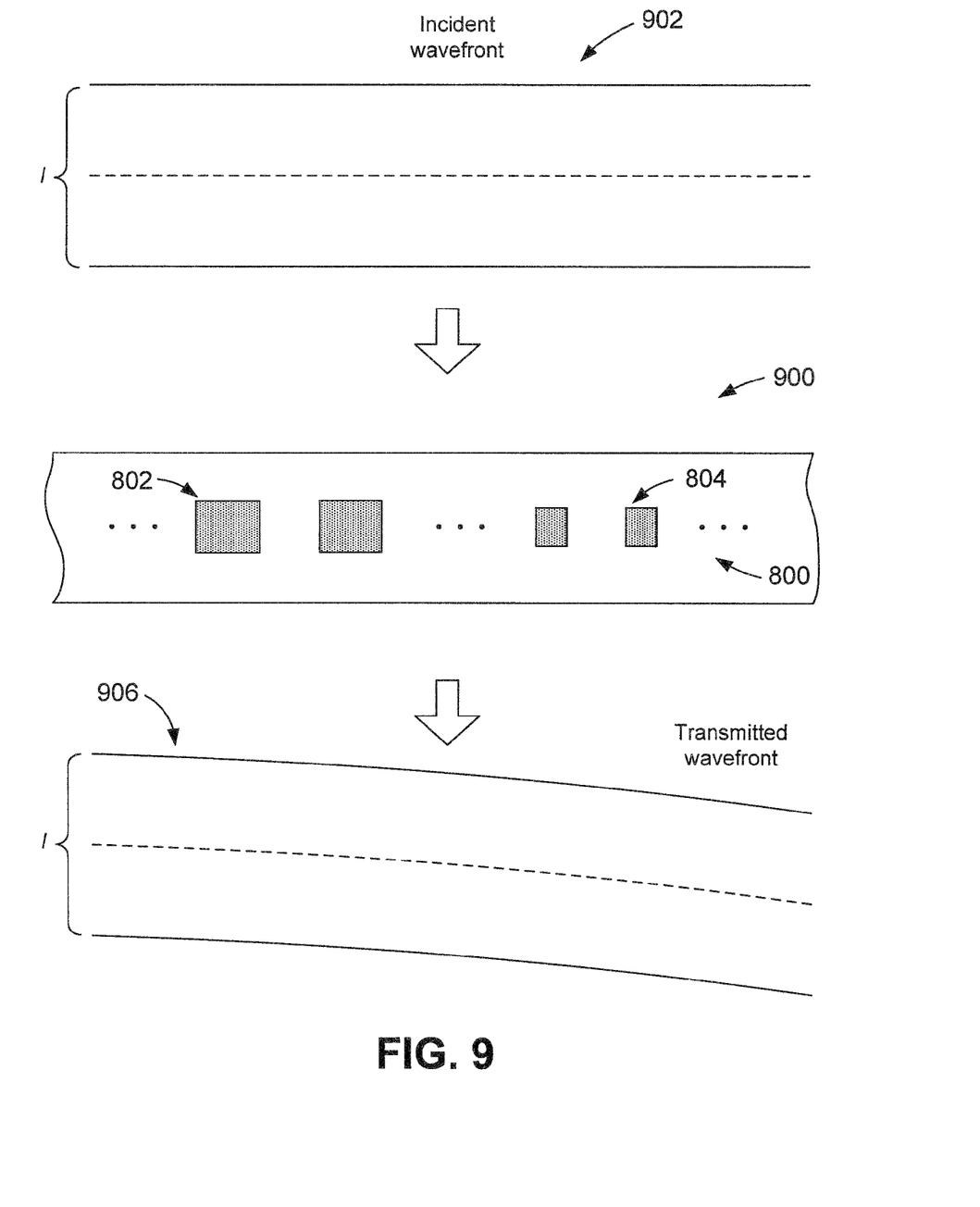
FIG. 9 shows a cross sectional view of a SWG layer in operation illustrating how a transmitted wavefront may be changed according to an example.

FIG. 9 shows a cross sectional view of a SWG layer 900 in operation illustrating how a transmitted wavefront may be changed according to some examples. In the example, incident light with a substantially uniform wavefront 902 impinges on SWG layer 900 producing transmitted light with a curved transmitted wavefront 906. Transmitted wavefront 906 results from portions of incident wavefront 902 interacting with sub-region 802 of SWG 800 with a relatively larger duty cycle $\eta_1$ and thickness $t_1$ than portions of incident wavefront 902 interacting with sub-region 804 of SWG 800 with a relatively smaller duty cycle $\eta_2$ and thickness $t_2$. The shape of the transmitted wavefront 906 is consistent with the larger phase acquired by light interacting with sub-region 802 relative to the smaller phase shift acquired by light interacting with the sub-region 804.

Therefore, a SWG layer may be configured to provide arbitrary phase front shape modulation. Thereby, a SWG layer may be implemented in an optical device as described herein to implement a vast variety of optical functions. These functions may include, but are not limited to, deflecting a beam, splitting a beam into spectral components, filtering one or more spectral components in a beam, polarizing a beam, focusing or defocusing a beam, or collimating a beam with a non-parallel wavefront. In the following, some examples of SWG layers configured to implements these functions are illustrated.

A non-periodical SWG may be configured so that the SWG layer operates like a prism, i.e. controlling incident light by producing transmitted light that is deflected relative to the incident light. Such a SWG may be realized by forming a pattern with a duty cycle progressively varying in one direction.

In examples, a non-periodical SWG configured to operate like prism may act as a beam splitter when light including multiple spectral components impinges thereon. More specifically, a SWG layer may be arranged to induce a wavelength dependent phase change. Thereby, a SWG layer may split a multi-component wavefront incident thereon. Further, following a similar principle, a non-periodical SWG may be configured to control an incident wavefront by operating like a filter element when light including multiple spectral components impinges thereon. More specifically, a SWG layer may be designed to control an incident multi-component wavefront such that spectral components with some particular wavelengths are blocked and spectral components with other wavelengths are transmitted therethrough.

In some examples, a non-periodical SWG of a SWG layer may be configured such that the SWG layer operates like a lens, which might be configured for, for example, focusing, collimating, or expanding an incident beam. Such a SWG layer operating as a lens may be realized by forming a SWG pattern with a duty cycle symmetrically varying with respect to an axis of symmetry, the axis of symmetry defining an optical axis of the SWG layer.

A SWG layer can be configured with a two-dimensional non-periodical SWG so that the SWG layer can be operated to implement a specific wavefront control function or other optical functions such as focusing, expanding, or collimating an incident beam. In the example illustrated with respect to FIG. 7, a non-periodical SWG is comprised of lines. In other examples, a non-periodical SWG is composed of posts lines, the posts being separated by grooves. The duty cycle and period can be varied in the x- and y-directions by varying the post size. In other examples, a non-periodical SWG layer is composed of holes separated by solid portions. The duty cycle and period can be varied in the x- and y-directions by varying the hole size. Such post or holes may be arranged according to a variety of shapes such as circular or rectangular shapes.

Further, SWG layers may be arranged to operate as a lens through a diffractive pattern comprised of concentric rings. More specifically, such SWG layers include concentric rings formed from a dielectric material interleaved by a plurality of gaps separating the plurality of concentric rings. Further, such SWG layers may include a disc formed at, approximately, the center of the lens that is formed from the dielectric material. The disc may have a thickness similar to the thickness of the plurality of concentric rings. The dielectric material layer may include silica. The thickness, gap spacing, ring width, and ring number are selected to determine the optical characteristics (e.g., focal length) associated with the lens.

As illustrated above, a SWG layer can be arranged to implement a particular optical function by appropriately designing a phase change induced to an incident wavefront. There are a number of ways for designing the induced phase change. In an example, for configuring the SWG layer, a transmission profile may be determined using an appropriate computing tool, such as the application "MIT Electromagnetic Equation Propagation" ("MEEP") simulation package to model electromagnetic systems, or COMSOL Multiphysics® which is a finite element analysis and solver software package that can be used to simulate various physics and engineering applications. A determined transmission profile may be used to uniformly adjust geometric parameters of the entire SWG layer in order to produce a particular change in the transmitted wavefront.

Figure 10:
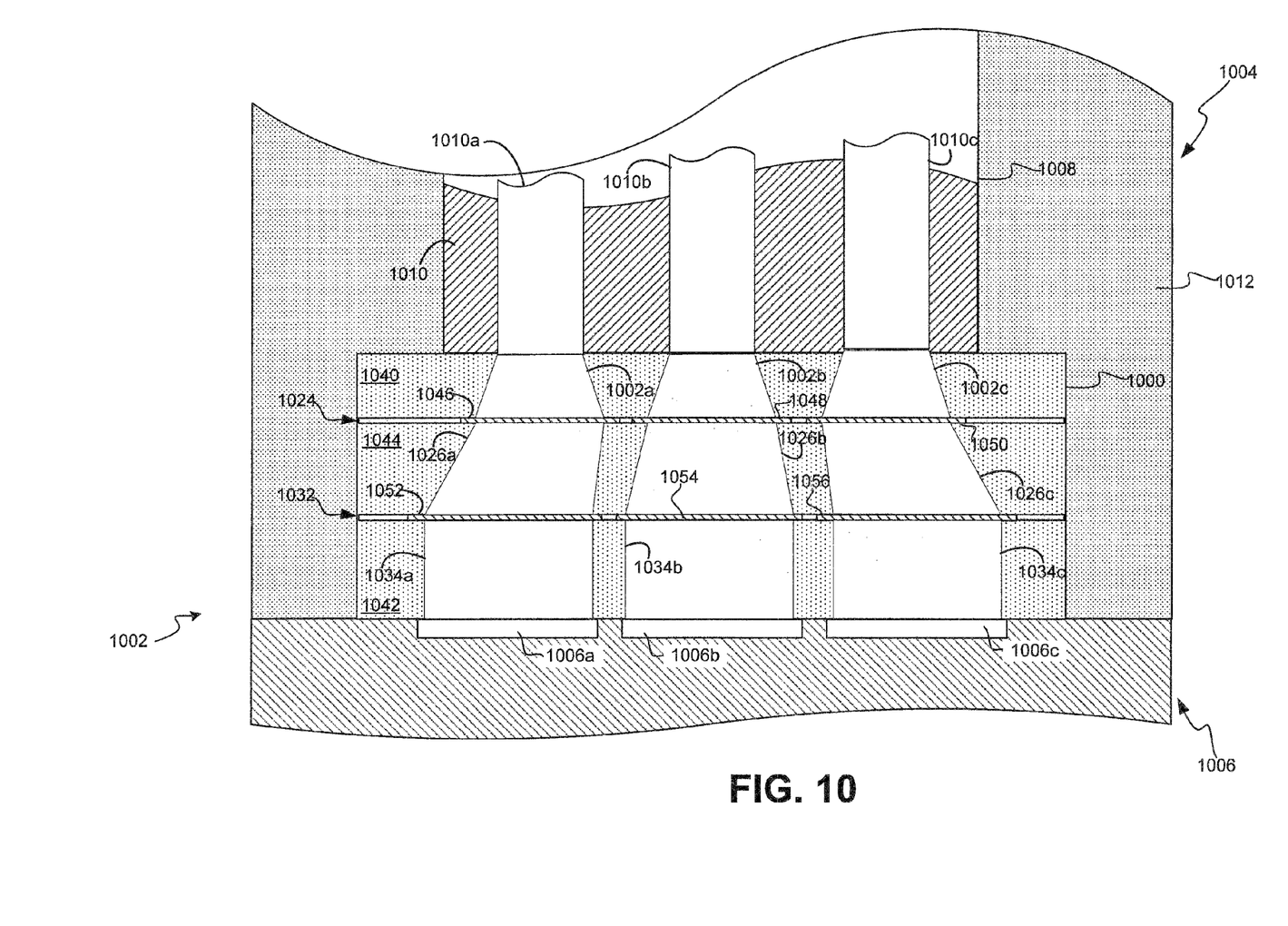
FIG. 10 is a schematic cross-sectional view of a portion of an interconnected optical system in operation for transmission of light beams according to another example.

SWG ASSEMBLIES: FIG. 10 depicts an example of a SWG assembly 1000 during operation within an interconnected optical system 1002. Another example of a SWG assembly in operation is illustrated above with respect to FIG. 5B. Implementations, however, are not limited to those examples. A variety of SWG assemblies may be integrated in a ferrule as illustrated in the present disclosure.

In the illustrated example, optical system 1002 includes an optical fiber connector 1004 and a corresponding optical component 1006. An example of a corresponding optical component 1006 is a PIC. Optical fiber connector 1004 includes a pathway 1008 for receiving a multicore optical fiber 1010 including three cores 1010a-1010c. Pathway 1008 is embedded into a ferrule 1012. A multicore optical fiber may include any number of cores depending on the particular environment where it is implemented.

SWG assembly 1000 is for optically interconnecting cores 1010a-1010c of fiber 1010 with optical channels 1006a-1006c of component 1006. SWG assembly 1000 may be integrated in ferrule 1012 following examples according to the procedure illustrated with respect to FIG. 6.

SWG assembly 1000 includes the following SWG sub-assemblies: (i) a SWG expanding sub-assembly 1024 to individually expand beams 1002a-1002c, propagating through medium 1040, into beams 1026a-1026c, and (ii) a SWG collimating sub-assembly 1032 to individually collimate beams 1026a-1026c, propagating through medium 1044, into collimated beams 1034a-1034c, propagating through medium 1042. SWG assembly 1016 further includes spacer 1044 interposed between SWG sub-assemblies 1024, 1032. Media 1040, 1042 may be provided as solid transparent layers integrated in SWG assembly 1000.

As illustrated in FIG. 10, SWG expanding sub-assembly 1024, in addition to beam expansion, also deflects beams 1002a, 1002c emitted from lateral cores 1010a, 1010c so as to separate lateral beams 1002a, 1002c from middle beam 1002b. Thereby, interference between the expanded beams is prevented. Further, SWG collimating sub-assembly 1032 is additionally arranged to deflect beams 1026a, 1026c such that collimated beams 1034a-1034c propagate parallelly to each other through medium 1042.

Each of SWG sub-assemblies 1024, 1032 includes SWG layers arranged to implement the above optical functions. More specifically, expanding SWG sub-assembly 1024 includes SWG layers 1046, 1048, 1050: SWG layers 1046, 1050 are arranged to expand and deflect, respectively, lateral beams 1002a, 1002c; SWG layer 1048 is arranged to expand middle beam 1002b. Further, SWG collimating sub-assembly 1032 includes SWG layers 1052, 1054, 1056: SWG layers 1052, 1056 are arranged to collimate and deflect, respectively, lateral beams 1026a, 1026c; SWG layer 1054 is arranged to collimate middle beam 1026b. The SWG layers in a sub-assembly are shown to be formed separate from each other. Alternatively, the SWG layers in a sub-assembly may be integrated in a single SWG layers with regions implementing the optical function of each individual SWG layer.

SWG assembly 1000 is specifically configured to separate and collimate a plurality of beams. Such a SWG assembly may be particularly convenient for optically coupling input channels with output channels having different relative spatial separations. Such situation may, for example, arise when interconnecting a multicore optical fiber with an optical device such as a PIC or an optical transceiver as illustrated in the example of FIG. 10.

SWG assembly 1000 is a specific example of an assembly including stacked SWG layers arranged to implement a particular connectability between optical components. It will be understood that a variety of SWG layers configurations with different layer numbers and functions may be implemented depending on the particular application of the connector where the SWG assembly is to be operated. Further, SWG layers in a SWG assembly may provide other optical functions in addition to or as an alternative to beam shaping and control such as filtering of spectral components, beam splitting or beam polarization.

CONCLUSION: The described examples illustrate ferrules and connectors as well as manufacturing techniques. As discussed above, examples may be successfully deployed in optical fiber connectors. However, examples may also be used in any type of connector devices capable of carrying a light signal such as connectors with any type of optical waveguides. Connectors that are contemplated herein include, but are not limited to, plugs, adapters, interconnections, or optic interface devices.

In the foregoing description, numerous details are set forth to provide an understanding of the examples disclosed herein. However, it will be understood that the examples may be practiced without these details. While a limited number of examples have been disclosed, numerous modifications and variations therefrom are contemplated. It is intended that the appended claims cover such modifications and variations. Claims reciting "a" or "an" with respect to a particular element contemplate incorporation of one or more such elements, neither requiring nor excluding two or more such elements. Further, the terms "include" and "comprise" are used as open-ended transitions.

What is claimed is:

1. An optical fiber connector comprising:
    a ferrule including an optical pathway for light transmission through the ferrule; and
    a sub-wavelength grating (SWG) assembly including an optical coupling region, the SWG assembly being integrated in the ferrule and the optical coupling region being aligned with an end of the optical pathway.

2. The connector of claim 1, wherein the connector is an expanded beam connector.

3. The connector of claim 1, wherein the SWG assembly is placed in a receptacle of the ferrule, the receptacle being aligned with the end of the optical pathway.

4. The connector of claim 1 further comprising a mating element at the ferrule and a corresponding mating element at the SWG assembly, the mating elements being arranged so as to align the SWG assembly with the end of the optical pathway.

5. The connector of claim 1 further comprising a mating element integrated in the ferrule to couple the ferrule to a complementary optical device.

6. An optical fiber ferrule comprising:
    a ferrule body including an optical pathway for light transmission; and
    a positioning arrangement to align a sub-wavelength grating (SWG) assembly with an end of the optical pathway, the SWG assembly including an optical coupling region, the positioning arrangement to align the end of the optical pathway with the optical coupling region.

7. The ferrule of claim 6, wherein the positioning arrangement includes a receptacle to receive a SWG assembly.

8. The ferrule of claim 6, wherein the positioning arrangement includes a mating element configured to position a SWG assembly at the ferrule aligned with the optical pathway.

9. The ferrule of claim 8, the positioning arrangement includes a pin formed at the ferrule to position a SWG assembly at the ferrule aligned with the optical pathway.

10. The ferrule of claim 6 comprising a plurality of optical pathways, the positioning arrangement being to align a SWG assembly with ends of the optical pathways.

11. A method, the method comprising:
    coupling a sub-wavelength grating (SWG) assembly to a ferrule, the ferrule including an optical pathway for light transmission, the SWG assembly including an optical coupling region,
    coupling including aligning the optical coupling region of the SWG assembly to an end of the optical pathway.

12. The method of claim 11, wherein coupling the SWG assembly includes inserting the SWG assembly in a receptacle formed at the ferrule so as to align the SWG assembly to the optical pathway end.

13. The method of claim 11, wherein coupling the SWG assembly includes automatically aligning the SWG assembly to an end of an optical pathway of the ferrule using an element of the ferrule as fiducial marker.

14. The method of claim 11, wherein coupling the SWG assembly includes coupling complementary elements formed at the ferrule and the SWG assembly so as to align the SWG assembly to the optical pathway end.

15. The method of claim 14, wherein the complementary elements includes a pin formed at the ferrule and a corresponding guide formed at the SWG assembly.

* * * * *